United States Patent [19]

Mickelson et al.

[11] Patent Number: 4,633,359

[45] Date of Patent: Dec. 30, 1986

[54] SURGE ARRESTER FOR RF TRANSMISSION LINE

[75] Inventors: N. Peter Mickelson, Buxton; Edward H. Shively, Raymond, both of Me.

[73] Assignee: GTE Products Corporation, Stamford, Conn.

[21] Appl. No.: 655,127

[22] Filed: Sep. 27, 1984

[51] Int. Cl.[4] .............................................. H02H 9/06

[52] U.S. Cl. ...................................... 361/119; 361/120

[58] Field of Search ............... 361/111, 117, 118, 119, 361/120, 110

[56] References Cited

U.S. PATENT DOCUMENTS

| | | | |
|---|---|---|---|
| 3,274,447 | 9/1966 | Nelson | 361/119 |
| 4,359,764 | 11/1982 | Block | 361/120 X |
| 4,409,637 | 10/1983 | Block | 361/120 X |
| 4,467,390 | 8/1984 | Carpenter, Jr. | 361/120 X |
| 4,509,090 | 4/1985 | Kawanami et al. | 361/120 X |

*Primary Examiner*—A. D. Pellinen
*Assistant Examiner*—Derek S. Jennings

[57] ABSTRACT

A surge arrester for coaxial RF transmission lines comprises a metal body having a longitudinal hole therethrough and having coaxial connectors. A gas discharge tube is orthogonally disposed and spring mounted between the center conductor and the metal body.

4 Claims, 1 Drawing Figure

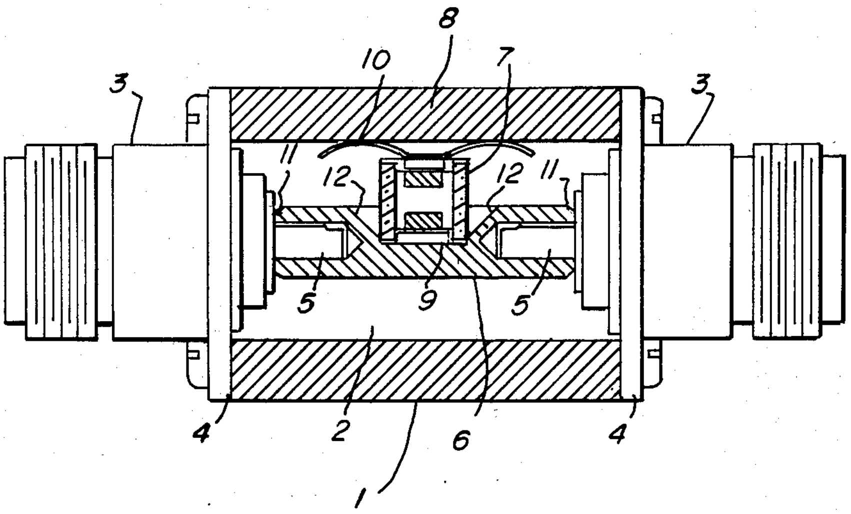
8
10
7
3
3
11
12
12
11
5
9
5
4
2
6
4
1

SURGE ARRESTER FOR RF TRANSMISSION LINE

This invention is concerned with gas tube surge arresters for coaxial RF transmission lines. Such arresters are shown in U.S. Pat. Nos. 4,359,764 and 4,409,637, and comprise a gas discharged tube fastened between an inner conductor and an outer conductor. The arrester is inserted in the transmission line and is constructed so as to match the impedance of the transmission line.

An arrester as per the instant invention is simpler and less expensive to fabricate than prior art gas tube surge arresters for coaxial RF transmission lines. The arrester utilizes a one piece center conductor with a gas discharge tube orthogonally disposed thereto. The gas discharge tube sits on a flat surface and is spring mounted between the center conductor and an outer conductor.

The drawing is a sectional view of one embodiment of a surge arrester in accordance with this invention.

The surge arrester in the drawing comprises a metal body 1 having a cylindrical hole 2 longitudinally therethrough. Fastened to each end of metal body is a standard coaxial connector 3 fastened to a metal plate 4 which seals off hole 2. A conductor in the form of a center pin 5 from each coaxial connector 3 extends into each end of hole 2. A substantially cylindrical metal center conductor 6 electrically connects one center pin 5 to the other center pin 5 and is supported by both center pins 5. A gas tube 7 is disposed between center conductor 6 and outer conductor 8, which comprises the outer shell of body 1. An end of gas tube 7 rests on a flat surface 9 on center conductor 6. Gas tube 7 is held in place by a somewhat flat spring 10 disposed between the other end of gas tube 7 and shell 8, and pressing against them both.

In one example, metal body 1 was made of brass and was one inch square by 1.25 inches long. Hole 2 was 0.625 inches diameter. Center conductor 6 was also made of brass and was one inch long by 0.23 inches diameter. At each end of center conductor 6 was a 0.12 inch diameter axial hole, 0.26 inches long, into which center pin 5 extended, as a press fit. Flat surface 9 was about 0.23 inches wide by about 0.318 inches long. Gas tube 7 was made by Claude, Type CA8B, and was 0.268 inches diameter by 0.311 inches long. Spring 10 was made of 7 mil thick beryllium copper.

In contrast to the prior art, this invention thus provides a continuous smooth center conductor 6 between coaxial connectors 3.

Flat surface 9, which is an undercut on center conductor 6, serves another purpose besides as a seat for gas tube 7. It adjusts the inductance of center conductor 6 to compensate for the distributed capacitance of gas tube 7 so that the impedance of the arrester matches the impedance of the RF coaxial transmission line.

We have found that susceptance of the arrester can be minimized by providing suitable chamfers 11 and 12 on center conductor 6. Chamfers 11 are at the ends of center conductor 6, while chamfers 12 surround the end of gas tube 7 where it contacts center conductor 6.

We have also found that the values for voltage standing wave ratio (VSWR) are dependent on the ratio of the diameter of center conductor 6 to the diameter of hole 2. Thus, the ratio of said diameters can be adjusted in order to minimize VSWR. In this arrester, said ratio was 0.23 inches divided by 0.625 inches, which equals 0.368.

It is not necessary for a spring to be physically located at an end of gas tube 7 in order for gas tube 7 to be Opring mounted between center conductor 6 and outer conductor 8. For example, such springiness could be provided by the use of spring compliant collars which could be inserted on center pins 5 and which would fit into suitable axial holes in the ends of center conductor 6.

We claim:

1. A surge arrester for coaxial RF transmission lines comprising a metal body having a longitudinal hole therethrough and having a coaxial connector at each end of the metal body, a continuous smooth one-piece center conductor axially disposed in said hole and connected at its ends to said coaxial connectors, the center conductor being substantially cylindrical except for a flat surface at about its center, the center conductor having chamfers at its ends in order to minimize susceptance of the arrester, and a gas discharge tube orthogonally disposed and spring mounted between said center conductor and said metal body, the longitudinal hole having one diameter, the substantially cylindrical center conductor having another diameter, the ratio of the diameter of the center conductor to the diameter of the longitudinal hole being such as to provide a minimal VSWR value.

2. The surge arrester of claim 1 wherein chamfers are provided on said center conductor surrounding the end of said gas discharge tube in order to minimize susceptance of the arrester.

3. The surge arrester of claim 1 wherein a substantially flat spring is disposed between one end of said gas discharge tube and said metal body.

4. The surge arrester of claim 1 wherein said ratio is 0.368.

* * * * *